Sept. 15, 1942.     C. B. MOORE     2,295,960
MEASURING AND CONTROL APPARATUS
Filed Jan. 3, 1940

INVENTOR
COLEMAN B. MOORE
BY [signature]
ATTORNEY

Patented Sept. 15, 1942

2,295,960

UNITED STATES PATENT OFFICE

2,295,960

MEASURING AND CONTROL APPARATUS

Coleman B. Moore, Carroll Park, Pa., assignor to The Brown Instrument Company, Philadelphia, Pa., a corporation of Pennsylvania Application January 3, 1940, Serial No. 312,305

16 Claims. (Cl. 250—41.5)

The present invention relates to instrumentalities useful in measuring and/or controlling a variable condition, and more particularly relates to measuring and/or controlling apparatus adapted to produce effects in accordance with the deflection of a sensitive measuring element which controls the apparatus and deflects in accordance with variations in a control quantity or in a quantity to be measured, and in which because of the small magnitude of the element deflecting force it is not desirable, nor feasible, to have the said effects directly produced by the deflecting element.

An object of the invention is to provide a sensitive and extremely stable measuring instrument in which an element deflecting in accordance with changes in the value of a quantity to be measured is employed to control the illumination of a light sensitive device and thereby the operation of an electronic relay mechanism which is adapted to adjust the recording pen, indicating pointer or other exhibiting part of the instrument.

Another object of the invention is to provide a measuring and/or controlling instrument which is quick in its action and does not overrun or hunt and is adapted to produce the desired recording and/or controlling effects in response to small deflections of the most sensitive measuring instruments.

A further object of the invention is to provide a measuring and/or controlling instrument embodying solely mechanical means to prevent overrunning or hunting thereof.

In an embodiment of the present invention, an element deflecting in accordance with variations in a condition under measurement is employed to control the illumination of a photoelectric cell and the latter, in turn, is adapted to selectively control the rotation and direction of rotation of a reversible electrical motor in accordance with the extent to which it is illuminated. In order that the response of the motor to changes in the deflection of said deflecting element may be suitably sharp, an arrangement comprising a beam of light and an opaque shield are so positioned with respect to said photoelectric cell and deflecting element that when the latter is in its normal undeflected position the photoelectric cell will be illuminated to a predetermined degree and upon slight deflection of the deflecting element in one direction or the other from its normal position, the illumination of the photoelectric cell will be either completely cut off or materially increased. When the illumination of the photoelectric cell is so controlled and the light beam is suitably narrow it will be apparent that the reversible motor will be sharply controlled for rotation in one direction or the other in response to minute deflections of the sensitive measuring element and may be employed to effect a follow-up or rebalancing adjustment of the measuring system for restoring the illumination of the photoelectric cell to a predetermined normal value.

In accordance with the present invention the energization of the motor is so controlled that its speed will be proportional or substantially so, to the extent to which the sensitive deflecting element has departed from its normal position. When the motor is so operated its speed of rotation will be great when the deflection of the sensitive deflecting element is great, and its speed will decrease in accordance with the decrease in deflection of the sensitive deflecting element whereby the motor will come to rest at the precise position in which the illumination of the photoelectric cell is a predetermined, normal value. According to the present invention, the energization of the motor is interrupted by solely mechanical mechanism auxiliary to the basic measuring and/or controlling apparatus, the rate of interruption being inversely proportional to the magnitude of the deflection of the deflecting element from its normal position so that the speed of the motor will be great when the sensitive element deflection is great and correspondingly reduced when the sensitive element deflection is reduced.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
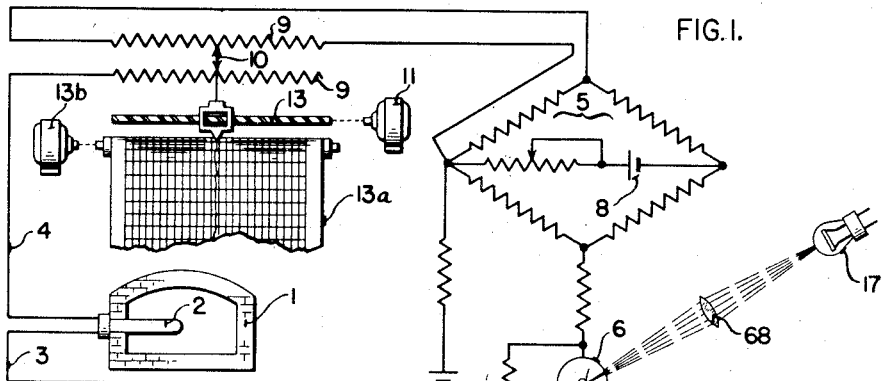
Fig. 1 is a diagrammatic view illustrating one embodiment of the invention as adapted for use in measuring and recording the temperature in a furnace.

In Fig. 1 of the drawing I have illustrated, more or less diagrammatically, a pyrometer for measuring and recording the temperature of the interior of a furnace 1. As illustrated a thermocouple 2 is arranged in the interior of the furnace and the terminals of the thermocouple are connected by conductors 3 and 4 to the terminals of a null point potentiometric network 5 which may be of any suitable type such as the Brown potentiometric network disclosed in Patent 1,898,124, issued February 21, 1933, to Thomas R. Harrison. The moving coil (not shown) of a galvanometer 6, which is of the reflecting type and equipped with a suitable mirror 7, is connected in the conductor 3. The rotation of the galvanometer moving coil is desirably restricted by mechanical stops (not shown).

The potentiometric network 5 is of a well known type, and, therefore, it is sufficient for the present purposes to note that the potentiometric network includes a circut branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite, and the galvanometer moving coil is thus rendered undeflected when the circuit is balanced for a given value of electromotive force developed by the thermocouple 2 with the contact 10 in a corresponding position along resistors 9. The position of the contact 10 is then a measure of the value of the thermocouple electromotive force, and as will be clear, may serve as a measure of the temperature to which the thermocouple is exposed.

In the embodiment illustrated in the drawing, my invention is specifically concerned with the means by which the contact 10 is adjusted back and forth along resistors 9 in response to galvanometer deflection, and as shown in Fig. 1 includes a reversible electrical motor 11 the rotation and direction of rotation of which is adapted to be selectively controlled in accordance with the illumination of a photoelectric cell 12. Motor 11 is connected in any convenient manner to contact 10 for adjusting the latter along resistors 9 and thereby effects rebalance of the potentiometric network 5 in response to a change in the electromotive force developed by the thermocouple 2. Specifically, the shaft of motor 11 is connected in any convenient manner to a screw shaft 13 and is adapted to adjust a carriage, on which the contact 10 is mounted, in one direction or the other along the length thereof as the shaft 13 is rotated.

Figure 2:
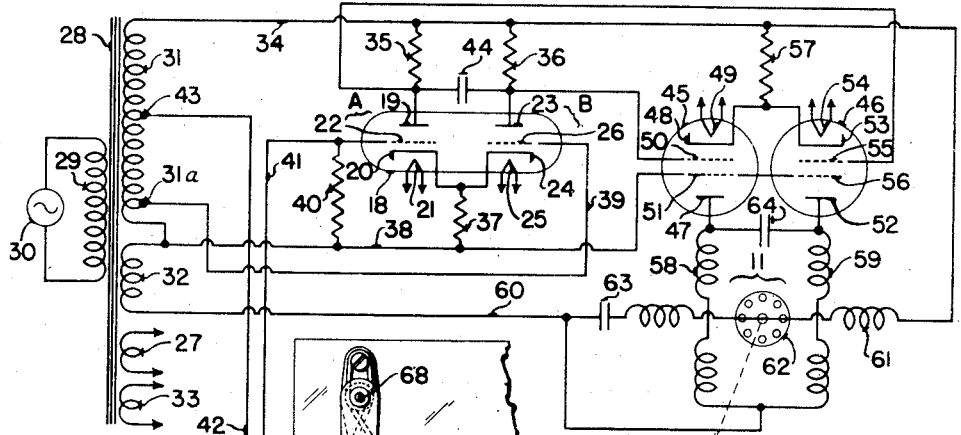
Fig. 2 illustrates in detail a controlling circuit for the rebalancing motor of the Fig. 1 arrangement and embodying a preferred form of the novel anti-hunting arrangement of my invention.

The means by which the rotation and the direction of rotation of the reversible electrical motor 11 is selectively controlled in accordance with the deflection of galvanometer 6 are illustrated in detail in Fig. 2, and as shown, includes an electronic amplifier 16 to the input circuit of which the photoelectric cell 12 is connected and to the output circuit of which a pair of opposed energizing windings of motor 11 are connected. The photoelectric cell 12 is preferably mounted in a casing (not shown) so as to be shielded from all external light except that emanating from a lamp 17, as seen in Fig. 1, and directed thereon by the galvanometer mirror 7, and is adapted to selectively control the flow of electric energizing current to the said opposed windings of motor 11.

The electronic amplifier 16 referred to includes an electronic valve 18, which as shown, is a twin amplifier type including two triodes in one envelope. For convenience of illustration the triodes of valve 18 have been designated by the references symbols A and B respectively. The triode A includes an anode 19, a cathode 20 and heater filament 21, and a control grid 22, and triode B includes an anode 23, a cathode 24 and heater filament 25, and a control grid 26. The heater filaments 21 and 25 of triodes A and B are connected in parallel and receive energizing current through conducting leads (not shown) from the secondary winding 27 of a transformer 28 having a line voltage primary windng 29, the terminals of which are connected to an alternating current supply source 30, and secondary windings 31, 32 and 33.

Anode voltage is supplied both triode sections of valve 18 from the transformer secondary winding 31 through a circuit which may be traced from the upper terminal of winding 31, as seen in Fig. 2, to a conductor 34, to a parallel circuit including in one branch a resistance 35 and the anode to cathode resistance of the triode A and including in the other branch a resistance 36 and the anode to cathode resistance of triode B, to a cathode biasing resistance 37 and a conductor 38 to the lower terminal of winding 31.

As shown, the control grid 26 of triode B is connected by a conductor 39 having low resistance to a point 31a on the transformer secondary winding and therethrough to the lower terminal of resistance 37, and the control electrode 22 of triode A is connected through a resistance 40 of suitable value directly to said terminal of biasing resistance 37. The control electrode 22 of triode A is also connected by a conductor 41 to the cathode of photoelectric cell 12, and the anode thereof is connected by a conductor 42 to a point 43 of suitable potential on the transformer secondary winding 31. Thus the conductivity of the triode B is adapted to remain substantially constant during the operation of the instrument, and the conductivity of the triode A is adapted to be increased and decreased with respect to the conductivity of the triode B in accordance with the illumination of the photoelectric cell 12. That is to say, when the illumination of the photoelectric cell is a predetermined, normal value, the conductivities of triodes A and B will be the same, and on an increase or decrease in the illumination of the photoelectric cell the conductivity of triode A will be increased and decreased, respectively, relatively to the conductivity of triode B.

The output circuits of the triodes A and B are coupled by the resistances 35 and 36 and a condenser 44, which is connected between the anodes of triodes A and B, to the input circuits of a pair of electronic valves 45 and 46. Valves 45 and 46 are heater type tetrodes, and as shown, valve 45 includes an anode 47, a cathode 48, a heater filament 49, a control grid 50 and a screen grid 51, and valve 46 includes an anode 52, a cathode 53, a heater filament 54, a control grid 55 and a screen grid 56. The heater filaments 49 and 54 of valves 45 and 46 may be connected in series or in parallel relation with each other and receive energizing current through conductors (not shown) from the transformer secondary winding 33. Anode voltage is supplied the valves 45 and 46 from the transformer secondary winding 31 and the transformer secondary winding 32, which as shown are connected in series relation, through a circuit which may be traced from the upper terminal of winding 31 to conductor 34, a cathode biasing resistance 57 to a parallel network including in one branch the anode to cathode resistance of valve 45, and a winding 58 of motor 11 and including in the other branch the anode to cathode resistance of valve 46, and a winding 59 of motor 11, and conductor 60 to the lower terminal of winding 32.

Figures 3, 4:
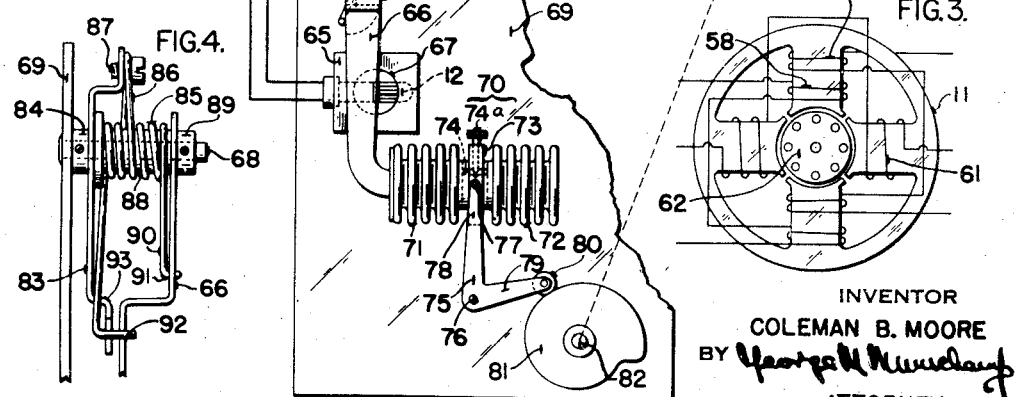
Fig. 3 is a diagrammatic view of the reversible motor of Figs. 1 and 2.
Fig. 4 is a detailed view of a portion of my novel anti-hunting arrangement shown in Fig. 2.

As illustrated more or less diagrammatically in Fig. 3 the motor 11 is of the induction variety and includes three windings, namely, the windings 58 and 59, a winding 61 and a squirrel cage rotor 62 with which two pairs of oppositely disposed field poles are associated. Winding 61 is wound on one pair of said field poles and windings 58 and 59 are wound on the other pair of poles, one half of winding 58 being wound on a portion of one of the field poles which is adjacent the rotor 62 and the other half being wound on a portion of the other pole remote from said rotor. Similarly, one half of winding 59 is wound on a portion of the last mentioned pole adjacent rotor 62 and the other half of winding 59 is wound on a portion of the first mentioned pole remote from said rotor.

As illustrated winding 61 is connected to the transformer secondary windings 31 and 32 through a suitable condenser 63 so that the current which flows through this winding will lead the voltage supplied by windings 31 and 32 by approximately 90°. Winding 58 is energized by the current flow conducted by valve 45 and the third winding 59 is energized by the current flow conducted by valve 46. A condenser 64 of suitable value is connected between the anodes 47 and 52 of the valves 45 and 46, respectively. Windings 58 and 59 are so wound on motor 11 with respect to the manner in which winding 61 is wound thereon that when they are equally energized rotor 62 will not be actuated for rotation in either direction but will remain stationary. When one winding 58 or 59 is energized to a greater extent than the other, however, the rotor 62 will be actuated for rotation in the corresponding direction. That is to say, when the anode to cathode resistance of valve 45 is approximately equal to the anode to cathode resistance of valve 46, the torque developed by winding 58 for producing rotation of the rotor 62 will be equal and opposite to the torque developed by the winding 59 and accordingly, the motor will remain stationary. When the anode to cathode resistance of one valve 45 or 46 is increased or decreased with respect to the other, however, the torque developed by winding 58 with respect to that developed by winding 59 will increase and decrease, respectively, and the motor will be actuated for rotation in a corresponding direction.

The manner in which the deflection of galvanometer 6 from its natural position operates to change the illumination of photoelectric cell 12 and thereby to selectively control the rotation and direction of rotation of the motor 11 is best described by considering Fig. 2 in connection with Fig. 1. As illustrated, a pair of shields 65 and 66 are arranged between the galvanometer mirror 7 and photoelectric cell 12 adjacent the latter. As seen in Fig. 2, shield 65 is in the form of a rectangular plate having a circular opening 67 through which a predetermined portion of the light reflected from lamp 17 by galvanometer mirror 7 is normally adapted to pass, the remainder being cut off by the shield 66. When the galvanometer mirror 7 is deflected in one direction, the light passing through the opening 67 will be increased and conversely, when the mirror 7 is deflected in the opposite direction the light therethrough will be reduced. It is noted that lamp 17 may be en electric lamp, or equivalent, and is disposed a suitable distance from mirror 7. Interposed between lamp 17 and mirror 7 is a lense 68 for converging the light rays from lamp 17 upon mirror 7.

It will thus be apparent that when the illumination of the photoelectric cell 12 is a predetermined, normal value, the conductivities of the triodes A and B of valve 18 will be the same, and as a result the conductivities of valves 45 and 46 will be the same whereby the rotor 62 of motor 11 will not be actuated for rotation in either direction but will remain stationary. When the illumination of the photoelectric cell 12 is increased or decreased, however, the conductivity of triode A will be correspondingly increased or decreased and accordingly the conductivity of valve 45 will be decreased or increased with respect to the conductivity of valve 46 and as a result rotation of rotor 62 of motor 11 will be produced in one direction or the other.

As noted hereinbefore, the shaft of motor 11 is connected in any convenient manner to the screw shaft 13 which is adapted when rotated to adjust the contact 10 in one direction or the other along the resistances 9 depending upon the direction of rotation thereof so that when the motor 11 is energized for rotation as a result of a change in the electromotive force developed by thermocouple 2, the motor will effect an adjusting movement of the contact 10 along the resistances 9 in the proper direction until the potentiometer circuit is again rebalanced. The unbalance current flow through galvanometer 6 will then be reduced to zero and the latter will return to its normal undeflected position whereupon the motor 11 will come to rest with the contact 10 at a new position along resistors 9, which position will then be a measure of the temperature of the interior of furnace 1.

If desired a pen may be mounted on the carriage which carries the potentiometer contact 10 and arranged in cooperative relation with a recorder chart 13a to thereby provide a continuous record of the temperature of the interior of furnace 1. The chart 13a may be a strip chart as shown and is adapted to be driven in any convenient manner, as, for example, by a unidirectional motor 13b through suitable gearing (not shown) so that a record of the temperature to which the thermocouple 2 is subjected will be recorded as a continuous line on the chart. It will be apparent that, if desired, a chart of the circular type may be employed in lieu of the strip chart 13a.

As will be apparent, when the potentiometric network is rebalanced at a fast rate of speed the galvanometer position will lag behind the position of the contact 10 so that the position of the galvanometer will not indicate the balanced condition until after contact 10 has moved past the proper position of balance. As a result when the galvanometer finally gets to its normal, undeflected position the potentiometric unbalance will be reversed and a hunting or oscillating action will be set up.

In order that the speed of motor 11 may be as great as possible during rebalancing without overshooting of the balance point and consequent hunting taking place, I have provided means to ensure that the motor speed and the rate of change of its speed is substantially proportional to the extent of potentiometric unbalance. Such means are desirable unless the motor has a suitable damping characteristic of its own. It is to this phase of the operation of high speed recorders and/or controllers that my present invention is particularly concerned.

As illustrated in Figs. 2 and 4, shield 66 is pivoted for rotation at its upper end on a shaft 68 which, in turn, is supported by and extends vertically from a stationary plate 69. The lower end of shield 66 is curved and is rigidly connected to the left end of a bellows assembly 70, as seen in Fig. 2. The bellows assembly 70 comprises two liquid filled bellows 71 and 72 which are rigidly mounted end to end on opposite sides of a supporting disc 73 of circular outline and the interiors of which are connected by a narrow opening or restriction 74. The liquid in the bellows is adapted to pass through the restriction 74 from one bellows 71 or 72 to the other at a suitably slow rate determined by the size of the restriction 74 on the occurrence of a difference in pressure to which the liquid in said bellows is subjected until the pressure in said bellows is equalized.

As seen in Fig. 2, the bellows assembly 70 is supported by and is adapted to be adjusted laterally by a bell crank 75 which is pivoted on a shaft 76 and has its upper end 78 connected by a pin 77 to a tangential point on the periphery of the supporting disc 73. The other end 79 of the bell crank 75 carries a roller 80 which rides on the periphery of a suitably configured cam 81. Cam 81 is pivoted for rotation on a shaft 82 which is connected through suitable gear mechanism (not shown) to the shaft of motor 11 and is adapted to be rotated through slightly less than 360° to thereby adjust the arm 79 of the bell crank 75 from an extreme low position to an extreme high position as the contact 10 is adjusted from one end of the resistors 9 to the other. With this arrangement it will be clear that when cam 81 is given rotational movement in one direction or the other by the motor 11 in response to a deflection of the light beam, the shield 66 will be rotated about its pivot 68 through the bell crank 75 and the bellows assembly 70.

When the potentiometric network 5 is in a balanced condition, shield 66 is maintained in such a position with respect to galvanometer mirror 7 and lamp 17 that when the galvanometer is in its normal, undeflected position, part of the light reflected from mirror 7 toward photoelectric cell 12 is intercepted thereby and the remainder of the light impinges on said cell. This is the normal equilibrium condition of the system and the energizing current then supplied the motor 11 is the proper value to maintain the latter in a stationary condition. The means by which the shield 66 is maintained in this normal position comprises a spring release mechanism illustrated more or less diagrammatically in Fig. 4 and disclosed and claimed in my copending application Serial No. 194,583, filed March 8, 1938, now Patent No. 2,203,057 for Pen release mechanism. A characteristic of this spring release mechanism is that all lost motion is eliminated and the force needed to move the shield 66 clockwise about the shaft 68 is exactly equal to the force required to move it counter-clockwise thereabout.

As shown in Fig. 4, lever 66 is resiliently connected to an arm 83 which is pivoted for rotation at a point intermediate its end on the shaft 68 and is spaced a suitable distance from the plate 69 by collar 84. This resilient connection consists of a spring 85 having a loop 86 which extends over a pin 87 carried on the upper end of arm 83. The opposite ends of the spring are wound around a bushing 88 which is carried by the shaft 68 and held in place by the collar 84 and a second collar 89, each of which are provided with a set screw. One end 90 of the spring 85 has hook 91 formed on its end to engage the side of shield 66 as seen in Fig. 4. The other end of the spring has a bent end 92 that overlies the front of an offset portion 93 of arm 83 and the lower end of lever 66. The coiled portion of spring 85 to the right of loop 86 has twice as many turns as the coiled portion of spring 85 to the left of loop 86 whereby the force of the last mentioned spring portion is exactly twice that of the former. Thus, with this arrangement it will require a force of one unit to rotate the shield 66 in a clockwise direction because although the left end portion of the spring exerts two units of force, one unit thereof is supplied by the right end portion of the spring which tends to produce clockwise motion of lever 66. Since the left end portion of the spring is stronger than the right end portion, the shield 66 will normally be maintained in a position wherein the bent portion 92 of the spring is in engagement with the arm 83 and said shield. This is the normal position of the shield 66.

In this position of the shield 66 the light impinging on the photoelectric cell 12 is precisely that value required to maintain the conductivity of valve 45 equal to the conductivity of valve 46 whereby motor 11 will remain stationary. When the potentiometric network 5 is unbalanced, however, the resulting deflection of galvanometer mirror 7 will produce a corresponding deflection of the light beam with respect to shield 66 and photoelectric cell 12. For example, on an increase in the electromotive force developed by thermocouple 2, galvanometer mirror 7 will rotate in a counterclockwise direction whereupon the light impinging on photoelectric cell 12 will be reduced. This is effective to effect a reduction in the conductivity of valve 46 relatively to the conductivity of valve 45 and as a result the torque developed by motor winding 58 will exceed that developed by winding 59. Motor 11 will then rotate in the direction to give the contact 10 a rebalancing adjustment and to give cam 81 a rotational adjustment in the counterclockwise direction. Such adjustment of cam 81 operates through the bellows assembly 70 to deflect shield 66 in the direction of deflection of the light beam. Similarly, on a decrease in thermocouple electromotive force and consequent deflection of the light beam in a clockwise direction, motor 11 will be energized for rotation in the opposite direction and accordingly shield 66 will again be deflected in the same direction as the light beam.

By so relating the direction of deflection of shield 66 and the direction of deflection from its normal position of the light beam reflected by the galvanometer mirror 7 towards photoelectric cell 12, it will be apparent that when motor 11 is energized due to galvanometer mirror deflection, the shield 66 will be moved in the same direction that the light beam was deflected to thereby restore the normal relationship between photoelectric cell 12, shield 66, and the light beam, and to nullify the effect of such mirror deflection. The normal photoelectric cell illumination having thus been restored, the motor 11 will be deenergized for rotation.

Such deflection of shield 66 is not permanent, however, due to the leakage of liquid through the restriction 74, which leakage gradually permits the spring release mechanism described to return the shield 66 to its predetermined, normal position. To this end the spring release mechanism is desirably made stronger than the stiffness of the bellows assembly throughout the operating range of the latter. The deflection of galvanometer mirror 7 will then be again effective to cause a reduction in the illumination of photoelectric cell 12 and thereby energization of motor 11 for rotation in the same direction. Deflection of shield 66 will again result and cause the energizing circuit to motor 11 to be interrupted whereby shield 66 will again return to its normal position. This action continues until the potentiometric network 5 is rebalanced and mirror 7 has assumed its normal, undeflected position.

By so interrupting the energizing current to motor 11 it will be apparent that the latter will not be permitted to coast beyond the position wherein the potentiometric network is balanced, but will come to rest precisely at that position. It will be noted that if the potentiometric network is appreciably unbalanced, mirror 7 will be deflected to a relatively great extent, and the interruptions of the motor circuit will not occur so often because of the greater deflection of shield 66 required. Moreover, by properly adjusting the various instrument parts, it will be apparent that such interruptions need not occur at all when the deflection of mirror 7 is great thereby permitting motor 11 to run at full speed in rebalancing the potentiometric network. As the potentiometric balance point is approached, however, the interruptions of the motor energizing circuit will become more numerous whereby the motor speed will be reduced and the latter will come to rest with potentiometer contact 10 at the exact balance point along resistors 9. If desired, the restriction 74 between the bellows 71 and 72 may be made adjustable, as for example, by a knob 74a, to permit adjustment of the rate of interruption of the motor 11 and thereby ready adaptation of the anti-hunting device disclosed to instruments of different ranges.

Thus, on an appreciable change in temperature in furnace 1, motor 11 will be continuously energized and effect rapid adjustment of contact 10 along resistors 9 until the thermocouple E. M. F. is almost balanced, and as the balanced position is approached, the energization of motor 11 will be interrupted to cause a reduction in motor speed and stopping of the motor at the exact balance point.

Figure 5:
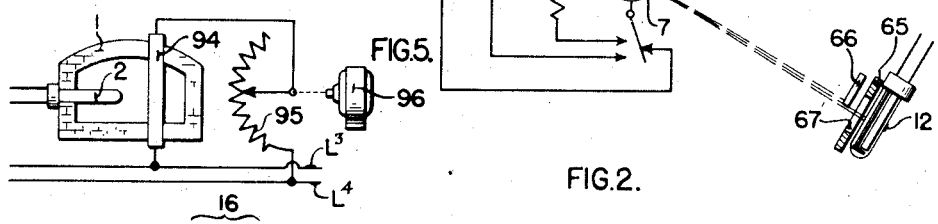
Fig. 5 is a diagrammatic view illustrating the use of the apparatus in the control system.

It will be apparent that motor 11 may be employed to operate a control valve or a rheostat for governing the application of an agent to a furnace for producing heat, for example, for which the thermocouple 2 is responsive, or another motor desirably operated together with motor 11 may be so employed. For example, as shown in Fig. 5, a furnace 1 to the temperature of which thermocouple 2 is responsive, is heated by a resistor 94 which is connected to electric supply conductors L³ and L⁴ through a rheostat 95 the adjustment of which is effected by a motor 96. The motor 96 may be exactly like motor 11 and connected by conductors (not shown) in parallel therewith. The mechanical connection of the rheostat 95 to the motor 96 is such as to decrease and increase the supply of electric current to resistor 95 as the temperature of furnace 1 rises above or drops below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, and means under control of said light sensitive device to control said first mentioned means to reduce the deflections of said light beam from said predetermined position, the combination with said second mentioned means of means continuously connected mechanically with said second mentioned means to adjust said movable shield relatively to said light beam for reducing the effect of such deflection.

2. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, and means under control of said light sensitive device to reduce the deflections of said light beam from said predetermined position, the combination with said second mentioned means of means continuously connected mechanically with said second mentioned means and with said movable shield to temporarily adjust the latter relatively to said light beam for reducing the effect of such deflection.

3. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, means tending to maintain said shield in a predetermined position, and means under control of said light sensitive device to control said first mentioned means to reduce the deflections of said light beam from said predetermined position, the combination with said third mentioned means of means continuously connected mechanically with said third mentioned means adapted to adjust said movable shield relatively to said light sensitive device in accordance with the operation of said third mentioned means, said last mentioned means including time delay means to neutralize the effect thereof of operation of said third mentioned means and thereby to reduce the deflection of said shield.

4. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, means tending to maintain said shield in a predetermined position, and means under control of said light sensitive device to control said first mentioned means to reduce the deflections of said light beam from said predetermined position, the combination with said third mentioned means of means continuously mechanically connected with said third mentioned means adapted to adjust said movable shield relatively to said light sensitive device in accordance with the operation of said third mentioned means, said last mentioned means including time delay means to neutralize the effect thereon of operation of said third mentioned means and thereby to reduce the deflection of said shield, and means to vary the rate of such neutralization.

5. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, means tending to maintain said shield in a predetermined position, and means under control of said light sensitive device to control said first mentioned means to reduce the deflections of said light beam from said predetermined position, the combination with said third mentioned means of a bellows assembly mechanically connected with said third mentioned means and with said movable shield to adjust said shield relatively to said light sensitive device for reducing the effect of such deflection, said bellows assembly including time delay means to neutralize the effect thereon of operation of said third mentioned means and thereby to reduce the deflection of said shield.

6. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, means tending to maintain said shield in a predetermined position, and means under control of said light sensitive device to control said first mentioned means to reduce the deflections of said light beam from said predetermined position, the combination with said third mentioned means of a bellows assembly mechanically connected with said third mentioned means and with said movable shield to adjust said shield relatively to said light sensitive device for reducing the effect of such deflection, said bellows assembly including a restriction to neutralize the effect thereon of operation of said third mentioned means and thereby to reduce the deflection of said shield.

7. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, and means under control of said light sensitive device to control said first mentioned means to reduce the deflections of said light beam from said predetermined position, the combination with said second mentioned means of a bellows having one end thereof connected to said movable shield, said bellows having a restriction through which the fluid therein is adapted to flow on a change in pressure in said bellows, cam means connected to said second mentioned means and adapted to be rotated in accordance with the operation of the latter, and a member adapted to be adjusted in accordance with the position of said cam means connected with said bellows at a point displaced from the end which is connected to said shield.

8. In measuring apparatus including a light sensitive device, means for impinging a beam of light on said light sensitive device and for producing deflections thereof from a predetermined position in accordance with variations from a predetermined value in a condition to be measured, a movable shield interposed between said first mentioned means and said light sensitive device, and means under control of said light sensitive device to control said first mentioned means to reduce the deflections of said light beam from said predetermined position, the combination with said second mentioned means of bellows assembly having one end thereof connected to said movable shield and comprising two flexible chambers which are connected by a restriction through which the fluid in said bellows is adapted to flow on the occurrence of a difference of pressure in said bellows, cam means connected to said second mentioned means and adapted to be rotated in accordance with the operation of the latter, and a member adapted to be adjusted in accordance with the position of said cam means connected to said bellows assembly at a point intermediate the ends thereof.

9. In combination, a deflectable member, means normally maintaining said member in a predetermined position, and means to temporarily deflect said member from said predetermined position including a bellows having one end thereof connected to said member, a fluid in said bellows, said bellows having a restriction through which the fluid therein is adapted to flow on a change in pressure in said bellows, adjustable cam means, means to adjust said cam means, and a device adapted to be adjusted in accordance with the position of said cam means connected with said bellows at a point displaced from the end which is connected to said member.

10. In combination, a deflectable member, means normally maintaining said member in a predetermined position, and means to temporarily deflect said member from said predetermined position including a bellows having one end thereof connected to said member, a fluid in said bellows, said bellows having a restriction through which the fluid therein is adapted to flow on a change in pressure in said bellows, an adjustable device having a connection with said bellows at a point displaced from the end which is connected to said member, and means to adjust said device.

11. In combination, a deflectable member, means normally maintaining said member in a predetermined position, and means to temporarily deflect said member from said predetermined position including a bellows having one end thereof connected to said member, a fluid in said bellows, said bellows having a restriction through which the fluid therein is adapted to flow on a change in pressure in said bellows, means to vary the size of said restriction and thereby the rate of flow of fluid therethrough, an adjustable device connected with said bellows at a point displaced from the end which is connected to said member, and means to adjust said adjustable device.

12. In combination, a deflectable member, means normally maintaining said member in a predetermined position, and means to temporarily deflect said member from said predetermined position including a bellows assembly having one end thereof connected to said member and comprising two flexible chambers each of which contains a fluid and which are connected by a restriction through which the said fluid is adapted to flow on the occurrence of a difference of pressure in said bellows, adjustable came means, means to adjust said cam means and a device adapted to be adjusted in accordance with the position of said cam means connected to said bellows assembly at a point intermediate the ends thereof.

13. In combination, a deflectable member, means normally maintaining said member in a predetermined position, and means to temporarily deflect said member from said predetermined position including a bellows assembly having one end thereof connected to said member and comprising two flexible chambers each of which contains a fluid and which are connected by a restriction through which the said fluid is adapted to flow on the occurrence of a difference of pressure in said bellows, an adjustable device connected to said bellows assembly at a point intermediate the ends thereof, and means to adjust said adjustable device.

14. In combination, a deflectable member, means normally maintaining said member in a predetermined position, and means to temporarily deflect said member from said predetermined position including a bellows assembly having one end thereof connected to said member and comprising two flexible chambers each of which contains a fluid and which are connected by a restriction through which the said fluid is adapted to flow on the occurrence of a difference of pressure in said bellows, means to vary the size of said restriction and thereby the rate of flow of fluid through said restriction on such occurrence, an adjustable device connected with said bellows assembly at a point intermediate the ends thereof, and means to adjust said adjustable device.

15. In a normally balanced electrical network adapted to be unbalanced in accordance with variations in a variable condition to be measured and adapted to be rebalanced on unbalance thereof, a light sensitive device, means for impinging a beam of light on said light sensitive device, means for producing deflections of said light beam in one direction or the other from a predetermined normal position in accordance with the direction of unbalance of said network, a movable shield interposed between said impinging means and said light sensitive device, means tending to maintain said shield in a predetermined position, means to rebalance said network upon unbalance thereof, and means under control of said light sensitive device to control said rebalancing means and thereby to reduce the deflections of said beam from said normal position, the combination with said rebalancing means of means continuously connected with said rebalancing means adapted to adjust said movable shield relatively to said light sensitive device in accordance with the operation of said rebalancing means, said last mentioned means including time delay means to neutralize the effect thereon of operation of said rebalancing means and thereby to reduce the deflection of said shield.

16. In a self balancing measuring instrument comprising measuring circuit means including a resistor and a contact engaging said resistor, said contact and resistor being relatively adjustable to vary the point along the length of said resistor at which the latter is engaged by the contact, reversible electrical motor means to relatively adjust said contact and resistor to thereby adjust their point of engagement along the length of said resistor in one direction or the other, a device adapted to be connected to said circuit and to a source of variable electromotive force to respond to changes in said electromotive force, and adapted to be actuated on each such response in the direction and to an extent selectively dependent on the direction and extent of the corresponding change in said electromotive force, control means through which said device is adapted when actuated to energize said motor means for operation in a direction and to an extent selectively dependent upon the direction and extent of said actuation, said control means including a light sensitive device, means for impinging a beam of light on said light sensitive device, means controlled by said device for producing deflections of said light beam in one direction or the other from a predetermined normal position in accordance with the actuation of said device, a movable shield interposed between said impinging means and said light sensitive device, and means under control of said light sensitive device to control said motor means, and thereby to reduce the deflections of said beam from said normal position, the combination with said motor means of a bellows assembly mechanically connected with said reversible motor means and with said movable shield to deflect said shield relatively to said light sensitive device for reducing the effect of deflection of said beam upon operation of said motor, said bellows assembly including a restriction to thereafter neutralize the effect thereon of operation of said reversible motor means and thereby to reduce the extent of deflection of said shield.

COLEMAN B. MOORE.